(12) United States Patent
Hong et al.

(10) Patent No.: US 11,050,122 B2
(45) Date of Patent: Jun. 29, 2021

(54) BATTERY MODULE AND BATTERY PACK AND VEHICLE COMPRISING THE SAME

(71) Applicant: LG CHEM, LTD., Seoul (KR)

(72) Inventors: Soon-Chang Hong, Daejeon (KR); Hyo-Chan Kim, Daejeon (KR); Hang-June Choi, Daejeon (KR); Kye-Yeon Ryu, Daejeon (KR)

(73) Assignee: LG Chem, Ltd., Seoul (KR)

( * ) Notice: Subject to any disclaimer, the term of this patent is extended or adjusted under 35 U.S.C. 154(b) by 77 days.

(21) Appl. No.: 16/348,023

(22) PCT Filed: May 24, 2018

(86) PCT No.: PCT/KR2018/005918
§ 371 (c)(1),
(2) Date: May 7, 2019

(87) PCT Pub. No.: WO2018/217040
PCT Pub. Date: Nov. 29, 2018

(65) Prior Publication Data
US 2019/0341595 A1 Nov. 7, 2019

(30) Foreign Application Priority Data
May 26, 2017 (KR) .......................... 10-2017-0065459

(51) Int. Cl.
*H01M 10/0525* (2010.01)
*H01M 50/502* (2021.01)
(Continued)

(52) U.S. Cl.
CPC ..... *H01M 50/502* (2021.01); *H01M 10/0525* (2013.01); *H01M 50/20* (2021.01);
(Continued)

(58) Field of Classification Search
CPC ...... H01M 2/206; H01M 2/1077; H01M 2/26; H01M 2/30; H01M 2/345; H01M 2/10;
(Continued)

(56) References Cited

U.S. PATENT DOCUMENTS 5,521,021 A   5/1996 Alexandres et al.
8,383,258 B2  2/2013 Kim et al.
(Continued)

FOREIGN PATENT DOCUMENTS

EP   2284929 A1   2/2011
JP   H11-40203 A  2/1999
(Continued)

OTHER PUBLICATIONS

International Search Report dated Sep. 7, 2018, issued in corresponding International Application No. PCT/KR2018/005918.
(Continued)

*Primary Examiner* — Milton I Cano
*Assistant Examiner* — Kiran Akhtar
(74) *Attorney, Agent, or Firm* — Morgan, Lewis & Bockius LLP

(57) ABSTRACT

A battery module according to the present disclosure includes a first busbar electrically connected to a first electrode lead of a first battery cell, a second busbar electrically connected to a second electrode lead of a second battery cell, a short part which moves to the first busbar and the second busbar and comes into contact with the first busbar and the second busbar by the application of an expansion force caused by volume increase of the first battery cell to electrically connect the first busbar to the second busbar, causing a short, and a cartridge which receives or supports at least part of the first electrode lead, the second electrode lead, the first busbar, the second busbar and the short part.

10 Claims, 13 Drawing Sheets

(51) Int. Cl.
*H01M 50/20* (2021.01)
*H01M 50/531* (2021.01)
*H01M 50/543* (2021.01)
*H01M 50/578* (2021.01)
*H01M 10/42* (2006.01)

(52) U.S. Cl.
CPC ....... *H01M 50/531* (2021.01); *H01M 50/543* (2021.01); *H01M 50/578* (2021.01); *H01M 10/42* (2013.01); *H01M 2200/20* (2013.01); *H01M 2220/20* (2013.01)

(58) Field of Classification Search
CPC ........ H01M 2/34; H01M 2/202; H01M 2/266; H01M 10/0525; H01M 10/42; H01M 2/20–34; H01M 50/502; H01M 50/20; H01M 50/531; H01M 50/543; H01M 50/578; H01M 2200/20; Y02E 60/10
See application file for complete search history.

(56) References Cited

U.S. PATENT DOCUMENTS

| | | | | |
|---|---|---|---|---|
| 2013/0323549 | A1* | 12/2013 | Choi | H01M 2/30 429/62 |
| 2014/0065467 | A1* | 3/2014 | Choi | H01M 2/204 429/158 |
| 2014/0248523 | A1* | 9/2014 | Roh | H01M 2/345 429/121 |
| 2014/0377600 | A1 | 12/2014 | Guen | |
| 2015/0132618 | A1 | 5/2015 | Han | |
| 2015/0171410 | A1* | 6/2015 | Shin | H01M 2/345 429/61 |
| 2016/0233465 | A1 | 8/2016 | Lee et al. | |
| 2017/0200935 | A1 | 7/2017 | Hong et al. | |

FOREIGN PATENT DOCUMENTS

| | | |
|---|---|---|
| JP | 2014-533424 A | 12/2014 |
| KR | 10-1046192 B1 | 7/2011 |
| KR | 10-1449307 B1 | 10/2014 |
| KR | 10-2014-0147313 A1 | 12/2014 |
| KR | 10-2015-0053597 A1 | 5/2015 |
| KR | 10-2016-0016503 A1 | 2/2016 |
| KR | 10-2016-0050543 A | 5/2016 |
| KR | 10-2016-0076156 A | 6/2016 |
| KR | 10-2016-0118689 A1 | 10/2016 |
| KR | 10-2017-0016065 A | 2/2017 |
| WO | 2009/057893 A1 | 5/2009 |
| WO | 2015/068871 A1 | 5/2015 |

OTHER PUBLICATIONS

First Office Action dated Jul. 13, 2020, issued in corresponding Japanese Patent Application No. 2019-530160.
Office Action dated Apr. 26, 2021, issued in corresponding Indian Patent Application No. 201917022414. Note: EP 2 284 929 and KR 2016-0016503 cited within are already of record.

* cited by examiner

BATTERY MODULE AND BATTERY PACK AND VEHICLE COMPRISING THE SAME

TECHNICAL FIELD

The present disclosure relates to a battery module and a battery pack and a vehicle comprising the same, and more particularly, to a battery module for preventing the overcharge of the battery module and improving stability and a battery pack and a vehicle comprising the same.

The present application claims priority to Korean Patent Application No. 10-2017-0065459 filed in the Republic of Korea on May 26, 2017, the disclosure of which is incorporated herein by reference.

BACKGROUND ART

Recently, with the dramatically increasing demand for portable electronic products such as laptop computers, video cameras, mobile phones, and the like, along with the extensive development of electric vehicles, accumulators for energy storage, robots, satellites, and the like, many studies are being made on high performance secondary batteries that can be repeatedly recharged.

Currently, commercially available secondary batteries include nickel cadmium batteries, nickel hydrogen batteries, nickel zinc batteries, lithium secondary batteries and the like, and among them, lithium secondary batteries have little or no memory effect, and thus they are gaining more attention than nickel-based secondary batteries for their advantages of free charging/discharging, very low self-discharging, and high energy density.

A lithium secondary battery usually uses a lithium-based oxide and a carbon material for a positive electrode active material and a negative electrode active material respectively. The lithium secondary battery includes an electrode assembly including a positive electrode plate and a negative electrode plate respectively coated with the positive electrode active material and the negative electrode active material with a separator interposed between, and a packaging or a battery case to hermetically receive the electrode assembly together with an electrolyte solution.

In general, lithium secondary batteries may be classified into can-type secondary batteries in which an electrode assembly is embedded in a metal can and pouch-type secondary batteries in which an electrode assembly is embedded in a pouch of an aluminum laminate sheet according to the shape of the case.

More recently, secondary batteries are being widely used in not only small devices such as portable electronic devices but also medium- and large-scale devices such as vehicles or energy storage systems. In particular, with the steady exhaustion of carbon energy and increasing interest in the environment, attention is paid to hybrid electric vehicles and electric vehicles all over the world including United States, Europe, Japan and the Republic of Korea. In such hybrid electric vehicles or electric vehicles, the most essential component is a battery pack that gives a driving power to an automobile motor. Because hybrid electric vehicles or electric vehicles are supplied with power for driving the vehicles through charging/discharging of battery packs, as compared to vehicles powered by an engine alone, they have higher fuel efficiency and can eliminate or lessen the emission of pollutants, and by this reason, the number of users is now increasing. The battery pack of hybrid electric vehicles or electric vehicles includes a plurality of secondary batteries, and the plurality of secondary batteries is connected in series and in parallel to improve the capacity and output.

A secondary battery has good electrical properties, but decomposition reactions of the components of the battery, an active material and an electrolyte take place under abnormal working conditions, for example, overcharge, overdischarge, high temperature exposure and electrical short, producing heat and gas, and as a result, there is a problem with expansion of the secondary battery, a so-called swelling phenomenon. The swelling phenomenon accelerates the decomposition reactions, causing explosions and fires of the secondary battery by thermal runaway phenomenon.

Accordingly, the secondary battery has a safety system, for example, a protection circuit that interrupts an electric current in the event of overcharge, overdischarge and overcurrent, a Positive Temperature Coefficient (PTC) Element having a sharp increase in resistance as a function of the rising temperature to interrupt an electric current, and a safety vent that interrupts an electric current or discharges gas when the pressure increases by the produced gas.

In particular, conventionally, to ensure safety of a battery pack in the event of a swelling phenomenon, studies have been made on an electrical connection member that induces a short in response to mechanical changes when the volume expansion of secondary batteries occurs.

However, despite the use of the electrical connection member, it is difficult to cope with a short circuit in case that secondary batteries expand beyond predetermined volume.

Additionally, because the secondary battery repeats predefined expansion and contraction not only in abnormal working condition but also in normal working condition, the secondary battery may be short-circuited by a normal range of expansion, and thus there is a problem with operation reliability.

DISCLOSURE

Technical Problem

The present disclosure is directed to providing a battery module in which a first busbar and a second busbar move toward each other and are brought into contact by the application of an expansion force caused by volume increase of a first battery cell, so that the first busbar and the second busbar are electrically connected to each other, causing a short, and a blow part formed in the first busbar is blown, thereby preventing the overcharge of the battery module, and a battery pack and a vehicle comprising the same.

The objects of the present disclosure are not limited to the above-mentioned objects and these and other objects and advantages of the present disclosure can be understood by the following description and will be apparent from the embodiments of the present disclosure. Additionally, it will be readily understood that the objects and advantages of the present disclosure can be realized by the means set forth in the appended claims and combinations thereof.

Technical Solution

To achieve the above-described object, a battery module according to the present disclosure includes a first busbar electrically connected to a first electrode lead of a first battery cell, a second busbar electrically connected to a second electrode lead of a second battery cell, a short part which moves to the first busbar and the second busbar and comes into contact with the first busbar and the second busbar by the application of an expansion force caused by volume increase of the first battery cell to electrically connect the first busbar to the second busbar, causing a short, and a cartridge which receives or supports at least part of the first electrode lead, the second electrode lead, the first busbar, the second busbar and the short part.

Preferably, the short part may include an elastic member which provides an elastic force facing the first busbar and the second busbar, and a slide bar which keeps the elastic member in deformed state by latch coupling of a latching part protruding at one end to produce the elastic force and a latching hole of the cartridge.

Preferably, the slide bar may restore the the elastic member from the deformed state when the latch coupling of the latching part and the latching hole is released by the application of the expansion force to the latching part, and move the first busbar and the second busbar and come into contact with the first busbar and the second busbar by the elastic force applied from the elastic member restored from the deformed state.

Preferably, the slide bar may have, at the other end, a short terminal which comes into contact with the first busbar and the second busbar to electrically short the first busbar and the second busbar.

Preferably, the short terminal may be formed from a conductive material.

Preferably, the cartridge may have a receiving space of a shape corresponding to a shape of the short part to receive the short part therein.

Preferably, the receiving space may be formed to fit a volume of the elastic member in restored state of the elastic member.

Preferably, the cartridge may support at least part of each of the first electrode lead and the first busbar electrically connected in surface contact, and support at least part of each of the second electrode lead and the second busbar electrically connected in surface contact.

Preferably, at least one of the first busbar and the second busbar may include a blow part which blows to block an electrical connection with outside when the short occurs.

A battery pack according to the present disclosure may include the above-described battery module.

A vehicle according to the present disclosure may include the above-described battery module.

Advantageous Effects

According to the present disclosure, electrical connection between the first busbar and the second busbar is established through an expansion force caused by volume increase of the first battery cell, causing a short, and the blow part formed in at least one of the first busbar and the second busbar is blown, thereby preventing the overcharge of the battery module and improving the stability of the battery module.

MODE FOR CARRYING OUT THE INVENTION

Figure 1:
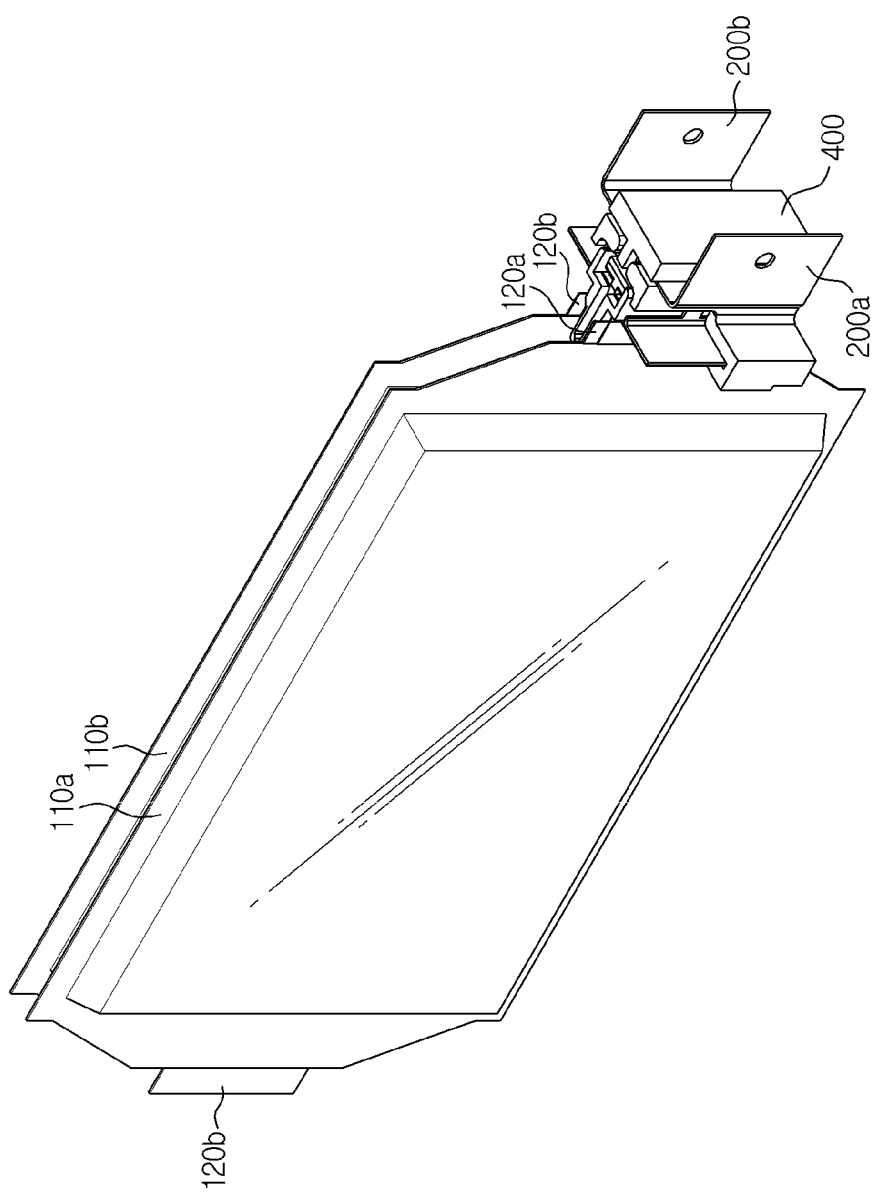
FIG. 1 is a perspective view of a battery module according to an embodiment of the present disclosure.

The above-described objects, features and advantages will be described in detail with reference to the accompanying drawings, and accordingly, those having ordinary skill in the technical field pertaining to the present disclosure will easily practice the technical aspects of the present disclosure. In describing the present disclosure, when it is deemed that a detailed description of relevant known technology unnecessarily renders the key subject matter of the present disclosure ambiguous, the detailed description is omitted herein. Hereinafter, preferred embodiments of the present disclosure will be described in detail with reference to the accompanying drawings. In the drawings, like reference numerals are used to indicate like or similar elements.

Figure 2:
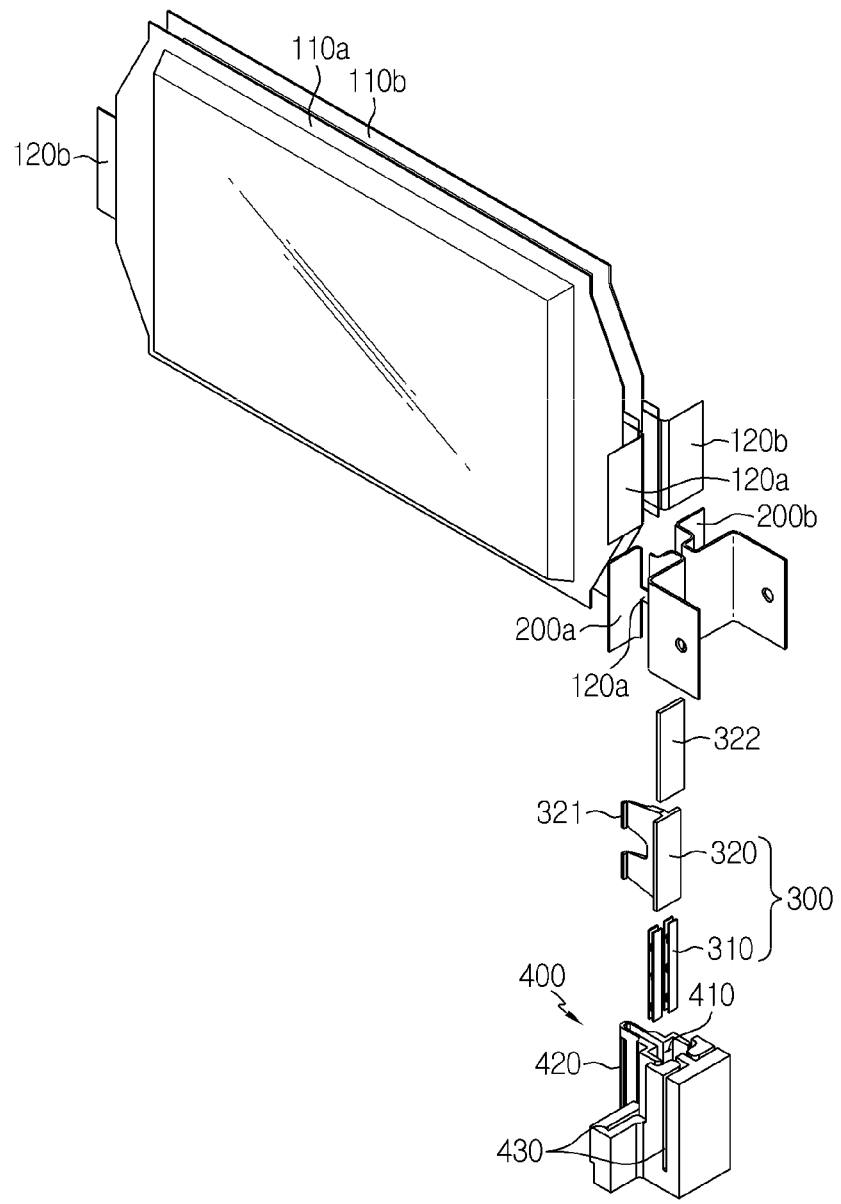
FIG. 2 is an exploded perspective view of a battery module according to an embodiment of the present disclosure.
Figure 3:
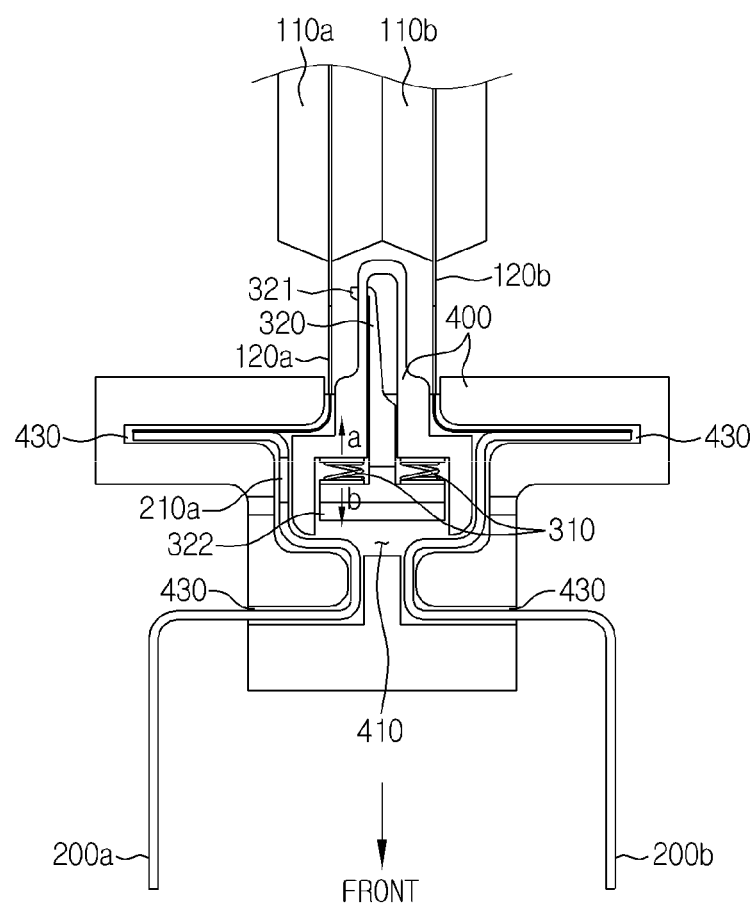
FIG. 3 is a diagram showing the top before volume increase of a battery module according to an embodiment of the present disclosure.

FIG. 1 is a perspective view of a battery module according to an embodiment of the present disclosure, FIG. 2 is an exploded perspective view of the battery module according to an embodiment of the present disclosure, and FIG. 3 is a diagram showing the top before volume increase of the battery module according to an embodiment of the present disclosure.

Referring to FIGS. 1 to 3, the battery module according to an embodiment of the present disclosure may include a battery cell 110*a*, 110*b*, a busbar 200*a*, 200*b*, a short part 300 and a cartridge 400.

A plurality of battery cells 110*a*, 110*b* may be provided, and each battery cell 110*a*, 110*b* may be stacked side by side in left-right direction.

The battery cell 110*a*, 110*b* is not limited to a particular type, and various types of secondary batteries may be employed in the battery module according to the present disclosure. For example, the battery cell 110*a*, 110*b* may include lithium ion batteries, lithium polymer batteries, nickel cadmium batteries, nickel hydrogen batteries and nickel zinc batteries. Particularly, the battery cell 110a, 110b may be a lithium secondary battery.

Meanwhile, the battery cell 110a, 110b may be classified into pouch type, cylindrical and prismatic according to the type of case. Particularly, the battery cell 110a, 110b of the battery module according to the present disclosure may be a pouch-type secondary battery.

When the battery cell 110a, 110b is implemented as a pouch-type secondary battery, as shown in FIG. 2, each battery cell 110a, 110b is arranged with wide surfaces positioned on the left and right sides, and the wide surfaces between each battery cell 110a, 110b face each other. Additionally, in this case, each battery cell 110a, 110b may have an electrode lead 120a, 120b that protrudes forward and is bent.

The electrode lead 120a, 120b may include a positive electrode lead and a negative electrode lead, and the positive electrode lead may be connected to a positive electrode plate of an electrode assembly and the negative electrode lead may be connected to a negative electrode plate of the electrode assembly.

Meanwhile, the battery cell 110a, 110b according to the present disclosure may include a first battery cell 110a disposed on the left side and a second battery cell 110b disposed on the right side. In this instance, each electrode of the first battery cell 110a and the second battery cell 110b is arranged such that the electrode leads 120a, 120b of opposite polarities face the same direction.

More specifically, as shown in FIG. 2, the first battery cell 110a may be disposed with the positive electrode or the first electrode lead 120a facing forward, and the second battery cell 110b may be disposed with the negative electrode or the second electrode lead 120b facing forward.

Additionally, the first battery cell 110a may be disposed with the negative electrode or the second electrode lead 120b facing rearward, and the second battery cell 110b may be disposed with the positive electrode or the first electrode lead 120a facing rearward.

In this instance, the second electrode lead 120b of the first battery cell 110a and the first electrode lead 120b of the second battery cell 110b may be electrically connected.

Meanwhile, the first electrode lead 120a of the first battery cell 110a may be electrically connected to the first busbar 200a as described below to receive the positive voltage from an external voltage source. Additionally, the second electrode lead 120b of the second battery cell 110b may be electrically connected to the second busbar 200b as described below to receive the negative voltage from an external voltage source.

Here, the first busbar 200a may be a busbar that is electrically connected to the first electrode lead 120a of the first battery cell 110a among the busbars 200a, 200b according to the present disclosure, and the second busbar 200b may be a busbar that is electrically connected to the second electrode lead 120b of the second battery cell 110b among the busbars 200a, 200b according to the present disclosure.

Hereinafter, the connection structure between the first electrode lead 120a of the first battery cell 110a and the first busbar 200a and the connection structure between the second electrode lead 120b of the second battery cell 110b and the second busbar 200b according to the present disclosure will be described in detail.

Figure 4:
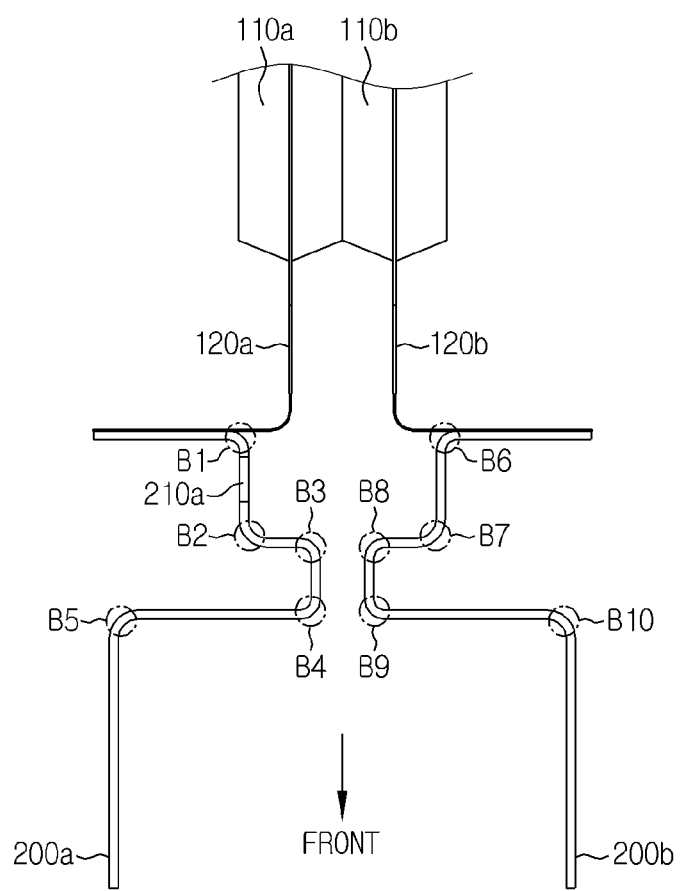
FIG. 4 is a diagram showing a first battery cell, a first busbar, a second battery cell and a second busbar of a battery module according to an embodiment of the present disclosure.

FIG. 4 is a diagram showing the first battery cell, the first busbar, the second battery cell and the second busbar of the battery module according to an embodiment of the present disclosure.

Further referring to FIG. 4, the first electrode lead 120a of the first battery cell 110a may protrude forward from the first battery cell 110a, and may be bent at an approximately right angle outward from the battery module and come into surface contact with the first busbar 200a.

Additionally, the second electrode lead 120b of the second battery cell 110b may protrude forward from the second battery cell 110b and may be bent at an approximately right angle outward from the battery module, i.e., toward the opposite direction to the direction in which the first electrode lead 120a of the first battery cell 110a is bent as described above, and come into surface contact with the second busbar 200b.

The first busbar 200a and the second busbar 200b are a long plate that runs in up-down direction and is shaped with multiple bends at a right angle.

More specifically, the first busbar 200a may include a first bent part B1 that comes into surface contact with the first electrode lead 120a of the first battery cell 110a and is bent forward at a right angle, a second bent part B2 that extends from the first bent part B1 and is bent inward the battery module, a third bent part B3 that extends from the second bent part B2 and is bent forward the battery module, a fourth bent part B4 that extends from the third bent part B3 and is bent outward from the battery module, and a fifth bent part B5 that extends from the fourth bent part B4 and is bent forward the battery module.

Additionally, the second busbar 200b may include a sixth bent part B6 that comes into surface contact with the second electrode lead 120b of the second battery cell 110b and is bent forward at a right angle, a seventh bent part B7 that extends from the sixth bent part B6 and is bent inward the battery module, an eighth bent part B8 that extends from the seventh bent part B7 and is bent forward the battery module, a ninth bent part B9 that extends from the eighth bent part B8 and is bent outward from the battery module, and a tenth bent part B10 that extends from the ninth bent part B9 and is bent forward the battery module.

In this instance, as the first busbar 200a and the second busbar 200b are bent and extend facing each other from the second bent part B2 and the seventh bent part B7, the distance between them reduces, and as they are bent and extend in parallel from the third bent part B3 and the eighth bent part B8 to the front of the battery module, the distance can be maintained.

Through this, the third bent part B3 of the first busbar 200a and the eighth bent part B8 of the second busbar 200b are disposed close to each other, so even though a short terminal (322 of FIG. 3) formed at the other end of a slide bar (320 of FIG. 3) of the short part (300 of FIG. 3) as described below has a small width, it can come into contact with the first busbar 200a and the second busbar 200b simultaneously to cause an electrical short in the first busbar 200a and the second busbar 200b.

Meanwhile, when the first electrode lead 120a of the first battery cell 110a and the first busbar 200a are brought into surface contact and electrically connected, they may be supported with parts being inserted into a support groove (430 of FIG. 2) of the cartridge (400 of FIG. 2) as described below.

Additionally, when the second electrode lead 120b of the second battery cell 110b and the second busbar 200b are brought into surface contact and electrically connected, they may be supported with parts being inserted into the support groove (430 of FIG. 2) of the cartridge (400 of FIG. 2) as described below.

The above-described cartridge (400 of FIG. 2) will be described in detail as below.

Figure 5:
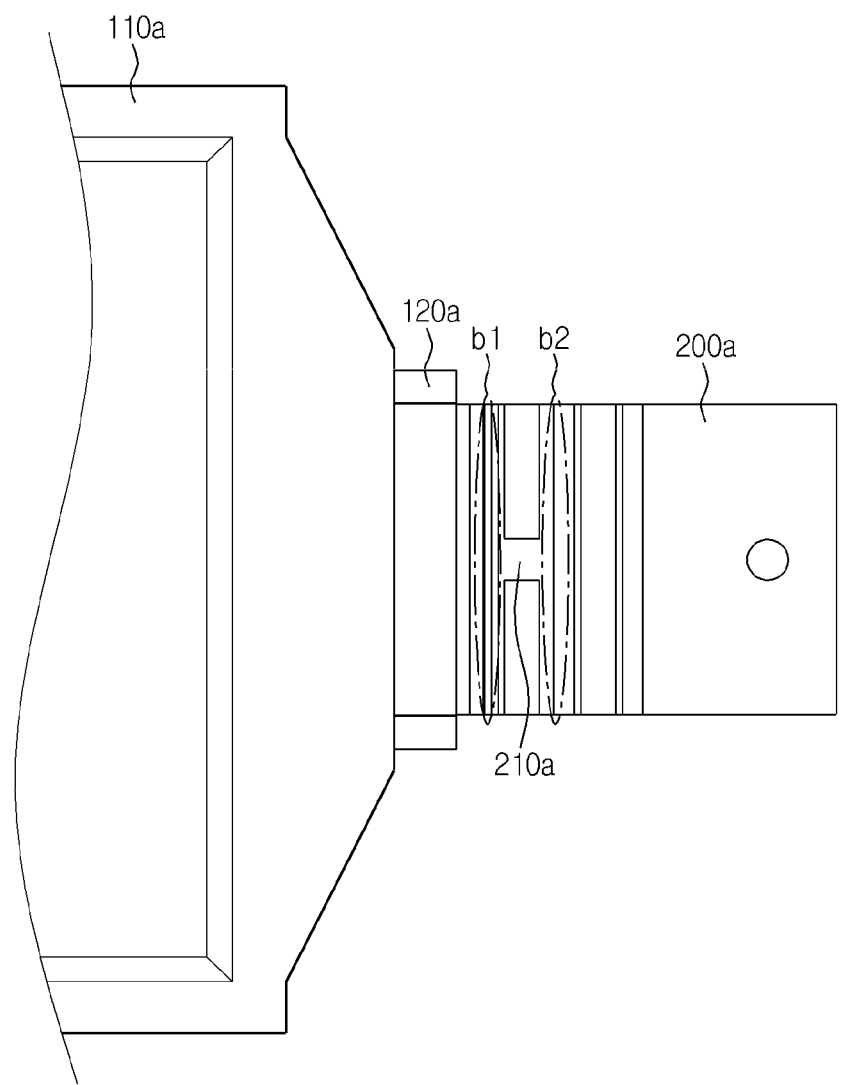
FIG. 5 is a diagram showing the side before blowing of a blow part of a battery module according to an embodiment of the present disclosure.
Figure 6:
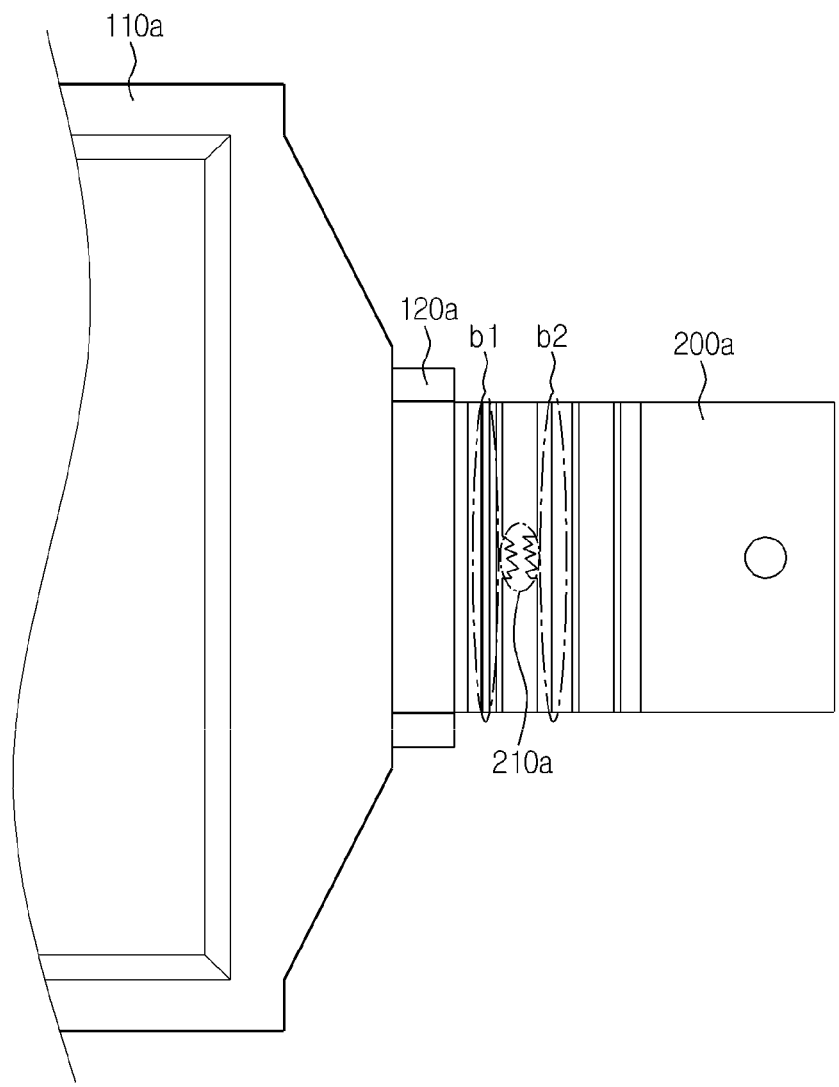
FIG. 6 is a diagram showing the side after blowing of a blow part of a battery module according to an embodiment of the present disclosure.

FIG. 5 is a diagram showing the side before blowing of the blow part of the battery module according to an embodiment of the present disclosure, and FIG. 6 is a diagram showing the side after blowing of the blow part of the battery module according to an embodiment of the present disclosure.

Further referring to FIGS. 5 and 6, the first busbar 200a may have a blow part 210a between the first bent part B1 and the second bent part B2, and the blow part 210a has a narrower cross-sectional area than the outer periphery between the first bent part B1 and the second bent part B2.

Because the blow part 210a has a narrower cross-sectional area than the outer periphery between the first bent part B1 and the second bent part B2, the blow part 210a may increase in the resistance value.

Accordingly, when the first busbar 200a and the second busbar (200b of FIG. 3) are electrically connected to form a short circuit between the first busbar 200a and the second busbar (200b of FIG. 3) and the external voltage source, as shown in FIG. 6, overcurrent flows in the first busbar 200a, producing high temperature resistance heat, and the blow part 210a may be blown.

Through this, when the first busbar 200a and the second busbar (200b of FIG. 3) are electrically connected, causing a short, the battery module according to the present disclosure may stop charging by blowing of the blow part 210a of the first busbar 200a that electrically connects the first electrode lead 120a of the first battery cell 110a to the external voltage source.

That is, the battery module according to the present disclosure may apply, to the short part (300 of FIG. 3), an expansion force caused by the volume increase of the first battery module 110a due to overcharge, to electrically connect the first busbar 200a and the second busbar (200b of FIG. 3). Subsequently, the battery module according to the present disclosure stops charging by blowing of the blow part 210a of the first busbar 200a when a high-current short current flows in the first busbar 200a and the second busbar (200b of FIG. 3), thereby preventing the overcharge of the battery module.

Meanwhile, although an embodiment of the present disclosure describes that the blow part 210a of the battery module is formed in the first busbar 200a, a blow part of a battery module according to another embodiment of the present disclosure may be formed in the second busbar, and a blow part of a battery module according to still another embodiment of the present disclosure may be formed in both the first busbar and the second busbar.

Additionally, as described above, the blow part 210a may have a narrower width than adjacent areas, but is not limited thereto, and may be formed from metal having a lower melting point than adjacent areas, and besides, any type that can act as a fuse may be applied as the blow part 210a of the present disclosure without limitation.

The above-described the short part 300 will be described with reference to FIGS. 1 to 3.

By the application of an expansion force caused by the volume increase of the first battery cell 110a, the short part 300 may move to the first busbar 200a and the second busbar 200b and come into contact with the first busbar 200a and the second busbar 200b, causing a short.

To this end, the short part 300 may include an elastic member 310 and a slide bar 320.

As shown in FIG. 3, the elastic member 310 may be deformed in the opposite direction to the first busbar 200a and the second busbar 200b by the slide bar 320, and provide an elastic force in the direction b facing the first busbar 200a and the second busbar 200b.

Figure 7:
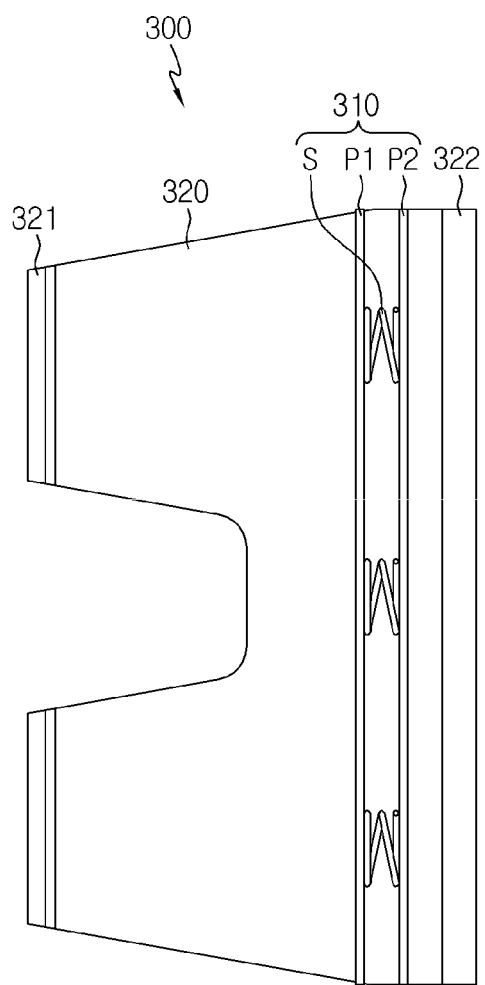
FIG. 7 is a diagram showing the side of a short part of a battery module according to an embodiment of the present disclosure.

FIG. 7 is a diagram showing the side of the short part of the battery module according to an embodiment of the present disclosure.

Further referring to FIG. 7, the elastic member 310 has a spring S inserted between a first plate P1 that contacts the inner side of the cartridge (400 of FIG. 3) and a second plate P2 that contact one end of the slide bar 320, to provide an elastic force in the direction facing the first busbar (200a of FIG. 3) and the second busbar (200b of FIG. 3).

As described above, the slide bar 320 may keep the elastic member 310 in deformed state by the latch coupling of a latching part 321 that protrudes at one end to produce an elastic force from the elastic member 310 and a latching hole (420 of FIG. 2) of the cartridge (400 of FIG. 3) as described below.

That is, the slide bar 320 may maintain compression by the latch coupling of the latching part 321 and the latching hole (420 of FIG. 2) when the elastic member 320 having the spring inserted between the two plates is compressed in the opposite direction to the first busbar (200a of FIG. 3) and the second busbar (200b of FIG. 3).

Figure 8:
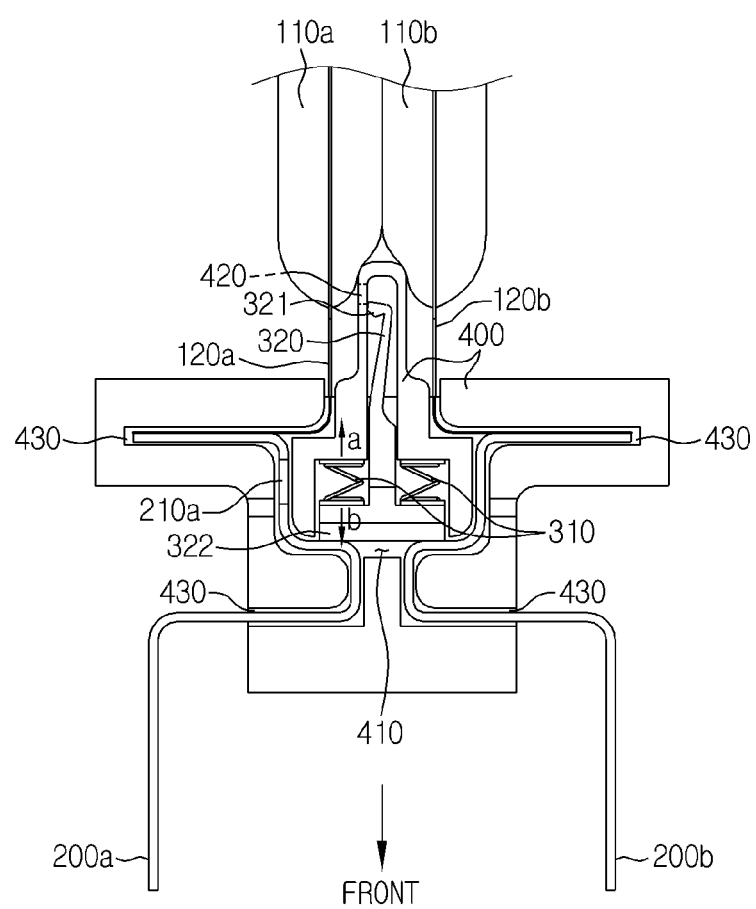
FIG. 8 is a diagram showing the top after volume increase of a battery module according to an embodiment of the present disclosure.

FIG. 8 is a diagram showing the top after volume increase of the battery module according to an embodiment of the present disclosure.

Further referring to FIG. 8, the latching part 321 formed at one end of the slide bar 320 may be subjected to the expansion force caused by the volume increase of the first battery cell 110a due to overcharge of the battery module. Accordingly, the latching part 321 may be released from the latch coupling with the latching hole 420 by the expansion force, and the elastic member 310 may be restored from the deformed state.

Subsequently, the slide bar 320 may move in the direction b facing the first busbar 200a and the second busbar 200b and simultaneously come into contact with the first busbar 200a and the second busbar 200b by the elastic force applied from the elastic member 310 restored from the deformed state.

To this end, the slide bar 320 has a short terminal 322 at the other end to electrically connect the first busbar 200a and the second busbar 200b, causing a short in a circuit including the first busbar 200a and the second busbar 200b.

Here, the short terminal 322 may be formed from a conductive material.

As described above, the battery module according to an embodiment of the present disclosure is such that the volume of the first battery cell 110a increases in the event of overcharge, producing an expansion force, which is applied to the short part 300, the elastic member 310 in deformed state is restored, and an elastic force produced from the elastic member 310 restored from the deformed state moves the slide bar 320 to the first busbar 200a and the second busbar 200b to electrically connect the first busbar 200a and the second busbar 200b, causing a short.

Hereinafter, circuit configuration after movement of the short part of the battery module according to an embodiment of the present disclosure will be described.

Figure 9:
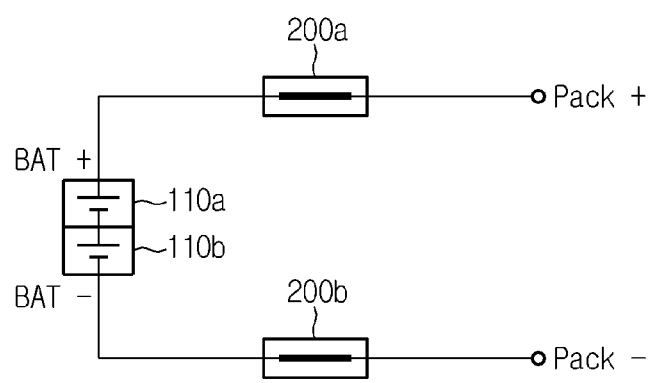
FIG. 9 is an equivalent circuit diagram before overcharge of a battery module according to an embodiment of the present disclosure.
Figure 10:
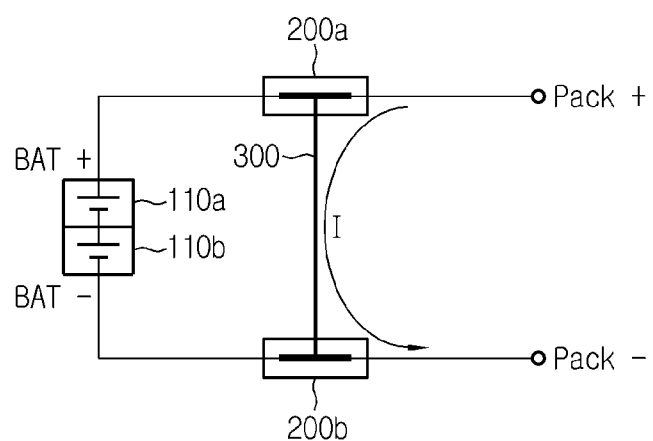
FIG. 10 is an equivalent circuit diagram immediately after movement of a short part after overcharge of a battery module according to an embodiment of the present disclosure.
Figure 11:
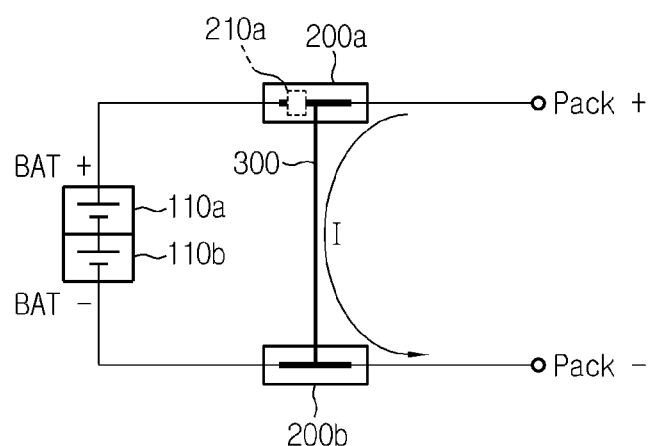
FIG. 11 is an equivalent circuit diagram after blowing of a blow part by movement of a short part after overcharge of a battery module according to an embodiment of the present disclosure.

FIG. 9 is an equivalent circuit diagram before overcharge of the battery module according to an embodiment of the present disclosure, FIG. 10 is an equivalent circuit diagram immediately after movement of the short part after overcharge of the battery module according to an embodiment of the present disclosure, and FIG. 11 is an equivalent circuit diagram after blowing of the blow part by movement of the short part after overcharge of the battery module according to an embodiment of the present disclosure.

Referring to FIGS. 9 to 11, when the battery module according to the present disclosure is not overcharged and operates in normal condition, as shown in FIG. 9, the volume of the first battery cell 110a does not increase, and the first busbar 200a and the second busbar 200b may not be electrically shorted.

However, when the battery module according to the present disclosure is overcharged, as shown in FIG. 10, by the application of an expansion force caused by the volume increase of the first battery cell 110a, the short part 300 moves to the first busbar 200a and the second busbar 200b and comes into contact with the first busbar 200a and the second busbar 200b to electrically connect the first busbar 200a and the second busbar 200b, causing a short.

Accordingly, a short circuit including the short part 300, the first busbar 200a and the second busbar 200b is formed, allowing a high current I to flow.

Subsequently, when the high current I continuously flows in the first busbar 200a, as shown in FIG. 11, the blow part 210a having a narrow cross-sectional area and a consequential large resistance value blows by generation of high temperature resistance heat, to interrupt the power supply from the external voltage source to the battery module, thereby preventing overcharge.

Figure 12:
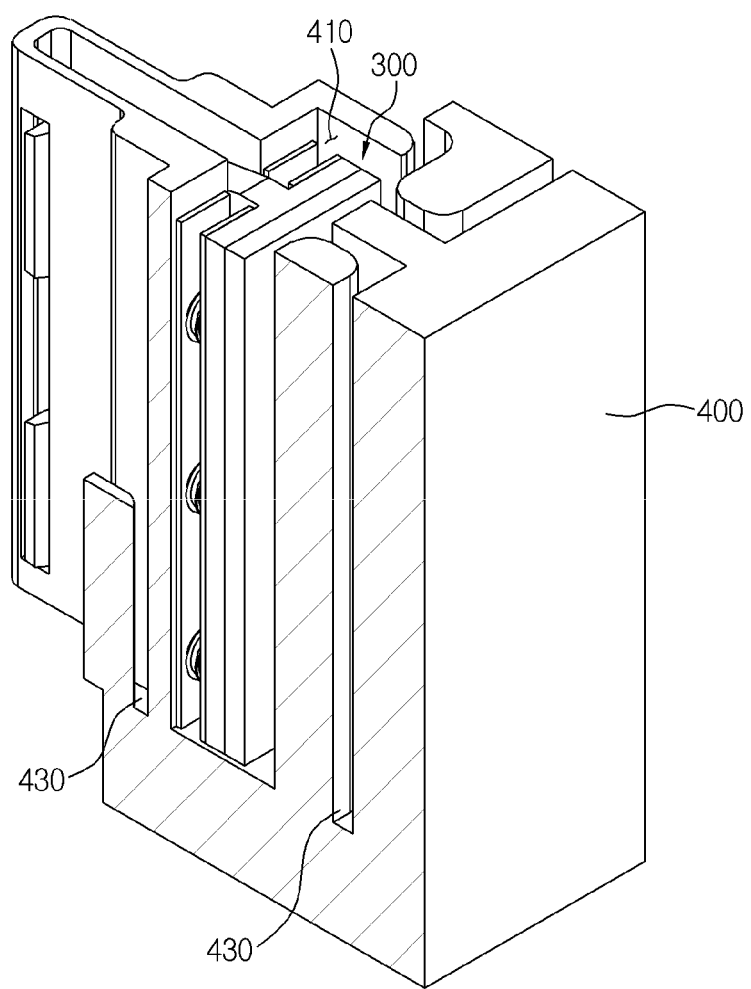
FIG. 12 is a diagram showing a cross section of a cartridge of a battery module according to an embodiment of the present disclosure.
Figure 13:
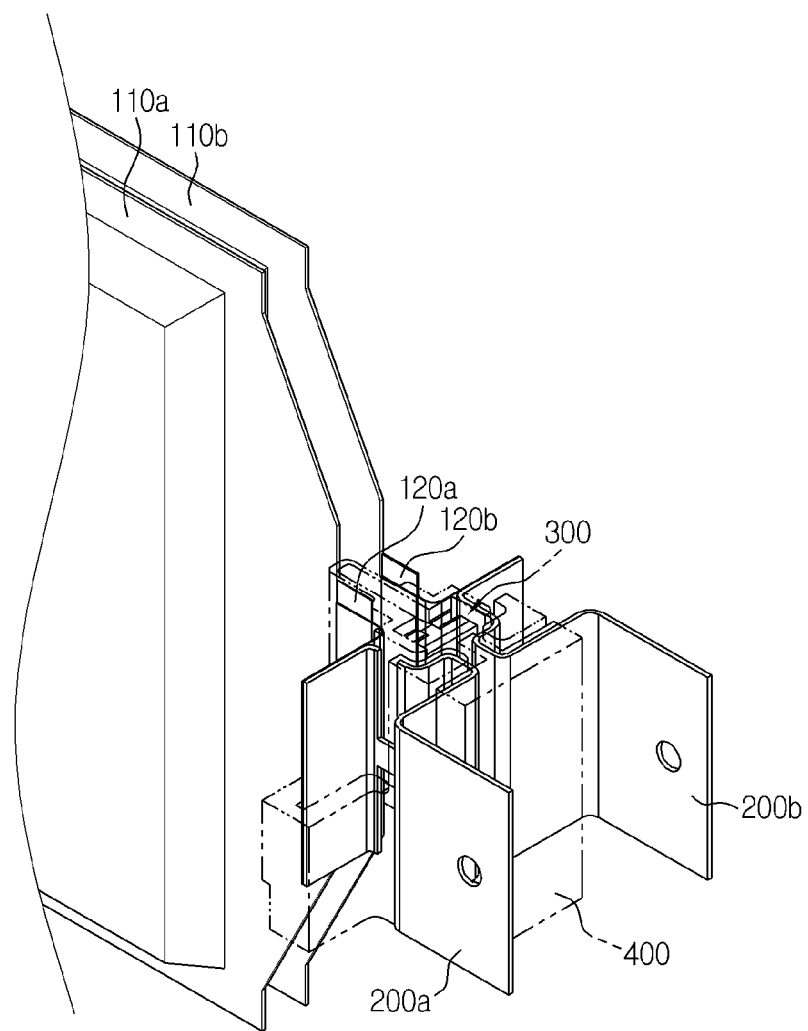
FIG. 13 is a perspective view showing the inner part of a cartridge of a battery module according to an embodiment of the present disclosure.

FIG. 12 is a diagram showing the cross section of the cartridge of the battery module according to an embodiment of the present disclosure, and FIG. 13 is a perspective view showing the inner part of the cartridge of the battery module according to an embodiment of the present disclosure.

Referring to FIGS. 12 and 13, the cartridge 400 is disposed between the first battery cell 110a and the second battery cell 110b, to receive or support at least part of the second electrode lead 120b of the first battery cell 110a, the second electrode lead 120b of the second battery cell 110b, the first busbar 200a, the second busbar 200b and the short part 300.

More specifically, the cartridge 400 may support up the first electrode lead 120a of the first battery cell 110a and the first busbar 200a that are brought in surface contact and electrically connected, and support up the second electrode lead 120b of the second battery cell 110b and the second busbar 200b that are brought in surface contact and electrically connected.

To this end, the cartridge 400 may have a support groove 430 of a shape corresponding to the bent shape of the first electrode lead 120a of the first battery cell 110a, the second electrode lead 120b of the second battery cell 110b, the first busbar 200a and the second busbar 200b.

Meanwhile, the cartridge 400 may have a receiving space 410 of a shape corresponding to the shape of the short part 300 on the inner side to receive the short part 300 therein.

In this instance, the receiving space 410 of the cartridge 400 may be formed to fit the volume of the elastic member 310 of the short part 300 when restored from the deformed state.

That is, the receiving space 410 of the cartridge 400 may extend in the direction in which the volume of the elastic member 310 increases in response to the increasing volume when the elastic member 310 of the short part 300 is restored from the deformed state.

In the event of abnormal expansion of the battery cell, the battery module according to the present disclosure accurately blows the first busbar to interrupt the power supplied from the external voltage source, thereby preventing the overcharge of the battery module and improving the stability of the battery module.

Meanwhile, the battery pack according to the present disclosure includes at least one battery module described above. In this instance, in addition to the battery module, the battery pack may further include a case to receive the battery module and various types of devices to control the charge/discharge of the battery module, for example, a Battery Management System (BMS), a current sensor, a fuse, and the like. Particularly, the battery pack according to an embodiment of the present disclosure has a first busbar, a second busbar, a short part and a cartridge for each battery module to perform overcharge prevention for each battery module by blowing the first busbar to interrupt the power supplied from the external voltage source in the event of abnormal expansion of the battery cell.

The battery module according to the present disclosure may be applied to a vehicle such as an electric vehicle or a hybrid electric vehicle. That is, the vehicle according to the present disclosure may include the battery module according to the present disclosure.

The above-described present disclosure is not limited to the above-described embodiments and the accompanying drawings, and it is obvious to those skilled in the art that many substitutions, modifications and changes may be made thereto without departing from the technical aspects of the present disclosure.

What is claimed is:

1. A battery module, comprising:
    a first busbar electrically connected to a first electrode lead of a first battery cell;
    a second busbar electrically connected to a second electrode lead of a second battery cell;
    a short part configured to move to the first busbar and the second busbar by the application of an expansion force caused by volume increase of the first battery cell to electrically connect the first busbar to the second busbar to cause a short; and
    a cartridge configured to receive or support at least part of the first electrode lead, the second electrode lead, the first busbar, the second busbar and the short part,
    wherein the short part comprises:
        an elastic member configured to provide an elastic force facing the first busbar and the second busbar; and
        a slide bar configured to keep the elastic member in a deformed state by latch coupling of a latching part protruding at one end to produce the elastic force and a latching hole of the cartridge.

2. The battery module according to claim 1, wherein the slide bar is configured to restore the elastic member from the deformed state when the latch coupling of the latching part and the latching hole is released by the application of the expansion force to the latching part, and is configured to move to the first busbar and the second busbar and to come into contact with the first busbar and the second busbar by the elastic force applied from the elastic member restored from the deformed state.

3. The battery module according to claim 1, wherein the slide bar has, at the other end, a short terminal that comes into contact with the first busbar and the second busbar to electrically short the first busbar and the second busbar.

4. The battery module according to claim 3, wherein the short terminal is formed from a conductive material.

5. The battery module according to claim 1, wherein the cartridge has a receiving space of a shape corresponding to a shape of the short part to receive the short part therein.

6. The battery module according to claim 5, wherein the receiving space fits a volume of the elastic member in restored state of the elastic member.

7. The battery module according to claim 1, wherein the cartridge is configured to support at least part of each of the first electrode lead and the first busbar electrically connected in surface contact, and is configured to support at least part of each of the second electrode lead and the second busbar electrically connected in surface contact.

8. The battery module according to claim 1, wherein at least one of the first busbar and the second busbar includes a blow part that blows to block an electrical connection with outside when the short occurs.

9. A battery pack comprising the battery module according to claim 1.

10. A vehicle comprising the battery module according to claim 1.

\* \* \* \* \*